United States Patent
Landt et al.

[11] Patent Number: 5,504,485
[45] Date of Patent: Apr. 2, 1996

[54] SYSTEM FOR PREVENTING READING OF UNDESIRED RF SIGNALS

[75] Inventors: Jeremy A. Landt; Alfred R. Koelle, both of Santa Fe; Donald F. Speirs, Fairview, all of N.M.

[73] Assignee: Amtech Corporation, Santa Fe, N.M.

[21] Appl. No.: 278,276

[22] Filed: Jul. 21, 1994

[51] Int. Cl.$^6$ .................................................. G01S 13/76
[52] U.S. Cl. ............................................. 342/42; 342/44
[58] Field of Search .............................. 342/42, 44, 50, 342/51

[56] References Cited

U.S. PATENT DOCUMENTS

| | | | |
|---|---|---|---|
| 3,646,580 | 2/1972 | Fuller et al. | 342/42 |
| 4,724,427 | 2/1988 | Carroll | 342/44 X |
| 4,857,893 | 8/1989 | Carroll | 340/572 |
| 5,053,774 | 10/1991 | Schuermann et al. | 342/44 |
| 5,166,676 | 11/1992 | Milheiser | 340/825.540 |
| 5,355,513 | 10/1994 | Clarke et al. | 455/20 |
| 5,410,315 | 4/1995 | Huber | 342/42 |

*Primary Examiner*—John B. Sotomayor
*Attorney, Agent, or Firm*—Roger S. Borovoy

[57] ABSTRACT

The invention provides a reader-transponder system that prevents reading of undesired transponder signals. The reader generates a low-frequency signal that is used to supply power to the transponder. The same low-frequency signal also is used to generate a clock signal for the transponder. The reader varies the frequency of the low-frequency power signal according to a code that is unique to the reader. Because the transponder clock signal is derived from the encoded low-frequency power signal, it also varies in accordance with the reader's code. The coded transponder clock signal is contained in the modulation of the RF signal produced by the transponder. When the reader receives and decodes the RF signal, it also extracts the transponder clock signal from the received RF signal and compares variations in the extracted transponder clock signal to the code that was applied to the low-frequency power signal transmitted by the reader. If the pattern of variations in the transponder clock signal matches the reader's code, then the reader senses that the RF signal it has received is from a transponder being powered by that reader and no other.

4 Claims, 2 Drawing Sheets

SYSTEM FOR PREVENTING READING OF UNDESIRED RF SIGNALS

This invention provides a reader-transponder system in which the reader transmits a coded low frequency signal that supplies power and a frequency-shift-coded clock signal for the transponder. The reader extracts the clock signal from the RF signals it receives from the transponder and compares the extracted clock signal code to the code broadcast by the reader to verify that the RF signals being received are from a transponder powered by that reader.

BACKGROUND OF THE INVENTION AND PRIOR ART

Systems for remote identification of objects are useful for many purposes, including identifying and locating objects such as trains or automobiles. Such systems use RF signals to communicate information between a reader apparatus and a remote transponder. The reader sends an RF signal to the transponder, an antenna in the transponder receives the signal, backscatter-modulates the received signal with data temporarily or permanently stored in the transponder (e.g., the identification number, the location of the transponder, or other information), and reflects this modulated signal back to the reader. The reader decodes these signals to obtain information from the transponder. The details of these transponders and readers have been previously described in U.S. Pat. Nos. 4,739,328 and 5,055,659, which are hereby incorporated by reference.

Because these transponders and readers communicate using microwave RF signals, it is difficult to restrict the zone in which a signal from a transponder can be read. However, in some reader-transponder systems, it is especially important that a reader not be able to transact with a transponder outside of a prescribed zone. In railroad applications, for example, readers may be mounted on locomotives and transponders positioned between the rails of track to report the locomotive's position and identify the track on which it is traveling. The information obtained by the reader is used as input for a train management system that can monitor and control the movement of numerous locomotives. Obviously, it is very important in such a system that the reader on a locomotive traveling on one track not read a transponder on an adjacent track. Such erroneous cross-track reading could lead to unnecessary braking (as when a locomotive reads the transponder on an adjacent track where another locomotive is traveling in the opposite direction) or worse (when two locomotives do not realize they are on the same track).

Train-mounted readers and track-mounted transponders using low-frequency magnetic coupling have been known for some time. In a typical system a transmitting coil at the reader sends power, and sometimes clock, information, or command signals, to a receiving coil at the transponder. If the transponder sends data back to the reader also via magnetic coupling, the inherent short range of the low-frequency magnetically coupled coils makes it essentially impossible for the reader to communicate with a transponder on an adjacent track. However, because the power transmission frequency or magnetic coupling retransmission frequency is usually in the range of 50 to 500 kHz, achievable data rates are limited to a few kilobits per second. Therefore, the data message is concomitantly limited to a few tens of bits at high train speeds.

Systems that power the transponder magnetically but return data from the transponder via a higher frequency (e.g., 915 MHz or 2450 MHz) RF transmitter or modulated RF reflector can have higher data rates and send longer messages in the available transaction time. But these systems run the risk that the transponder's RF signal will be captured and read by a reader on an adjacent track. RF systems must provide enough RF signal power to overcome increased RF attenuation due to such factors as snow, ice, water or debris covering the transponder, or degradation of reader and transponder performance with time and environmental effects. In a typical system, for example, a reserve of 30 db might be provided to accommodate the attenuation due to debris over a transponder. A link with sufficient reserve to read a transponder under worst-case conditions might, under favorable conditions, have sufficient capability for reading an RF signal from a transponder between the rails of an adjacent track. In addition, the presence of "stray" RF paths due to reflections off metal surfaces cannot be controlled in a practical way, especially in the cluttered environment underneath railway vehicles. Thus, the range of an ordinary RF data link cannot be restricted well enough to rule out these cross-track readings, which may be disastrous.

BRIEF DESCRIPTION OF THE INVENTION

The invention provides a reader-transponder system that substantially prevents undesired reading of transponders. In the system of the invention, the reader generates a low-frequency signal that is used to generate a clock signal for the transponder via magnetic coupling. The reader varies the frequency of the low-frequency signal according to a code that is unique to the reader. Because the transponder clock signal is derived from the encoded low-frequency signal, it varies in accordance with the reader's code. The coded transponder clock signal is embodied in the modulation of the RF signal reflected or transmitted by the transponder. When the reader receives and decodes the RF signal from a transponder, it also extracts the transponder clock signal from the received RF signal. The reader then compares the frequency variations of the extracted transponder clock signal to the pattern of frequency variations applied to the low-frequency signal transmitted by the reader. If the pattern of variations in the transponder clock signal matches the reader's code, then the reader knows that the RF signal it has received is from a transponder being powered by that reader and no other. The same low-frequency signal used to generate the transponder clock signal can also be used to supply power to the transponder.

DETAILED DESCRIPTION OF A PREFERRED EMBODIMENT OF THE INVENTION

Figure 1:
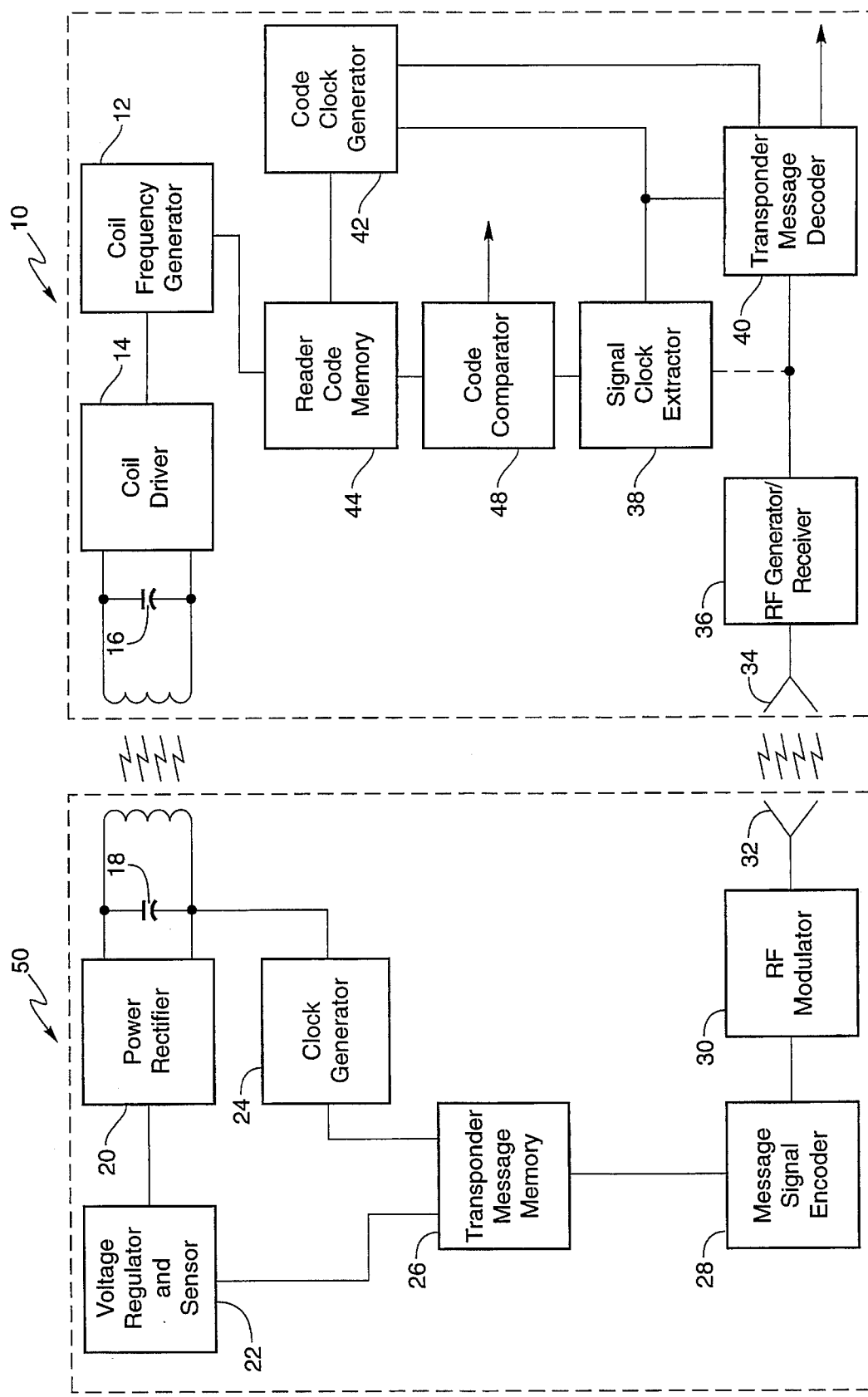
FIG. 1 is a block diagram of the circuit of the invention.

FIG. 1 is a block diagram of the system of the invention, consisting of reader 10 and transponder 50. Coil frequency generator 12 continuously supplies a low-frequency signal, e.g., 125 kHz, to coil driver 14, which powers reader coil 16. An inductive link is created when transponder coil 18 is in close proximity to reader coil 16, allowing transponder 50 to draw power from the low-frequency signal emitted by reader 10. Power rectifier 20 converts the ac signal in transponder coil 18 to a dc power signal for the transponder. Voltage regulator and sensor 22 operates as a threshold sensor; when it senses that the power supplied by power rectifier 20 has reached a certain level, e.g. 4.5 V, it sends a "message start"

command to transponder message memory 26. The voltage generated in transponder coil 18 varies with the distance between that coil and reader coil 16. When coils 16 and 18 are very close, the voltage supplied by power rectifier 20 may be as high as 20 V, exceeding the tolerance of other circuit components in the transponder. Accordingly, voltage regulator and sensor 22 also operates to limit the transponder voltage supply to an acceptable level, e.g. 5 V.

Clock generator 24 supplies a clock signal to transponder message memory 26 based on the ac signal in transponder coil 18. In the preferred embodiment, clock generator 24 consists of a phase-locked loop (PLL) that operates as an 8X frequency multiplier to generate a 1 MHz transponder clock signal from the 125 kHz signal received by transponder coil 18.

The structure and operation of transponder message memory 26 and message signal encoder 28 is described in more detail in U.S. Pat. No. 4,739,328. Transponder message memory 26 is typically a ROM that contains information specific to that transponder. In the railroad application described above, for example, the transponder message memory 26 would contain a binary sequence in an individual pattern corresponding to the transponder's exact location or other information. Message signal encoder 28 provides a signal that is coded according to the individual pattern supplied by transponder message memory 26.

The structure and operation of RF generator/receiver 36 and transponder message decoder 40 also are described in more detail in U.S. Pat. No. 4,739,328. RF generator/receiver 36 generates an unmodulated RF signal, which is transmitted by reader antenna 34. Some of this RF signal is intercepted by transponder antenna 32. RF modulator 30 modulates the reflectance or backscatter of transponder antenna 32 to the incident RF signal transmitted over reader antenna 34, in accordance with the pattern supplied by message signal encoder 28. The variably backscattered RF signal from transponder antenna 32 is intercepted by reader antenna 34, amplified and demodulated by RF generator/receiver 36, and decoded by transponder message decoder 40. Alternatively, one could use an active RF transmitter in transponder 50 and a conventional RF receiver in reader 10 to send the transponder message, in place of the backscatter RF data link.

The transponder message signal includes "frame markers," as described in U.S. Pat. No. 5,055,659. Frame markers serve as points of reference in the transponder message and mark the start of message code blocks. In the preferred embodiment of the invention, these frame markers are used to synchronize the encoding of the low-frequency signal so that a convenient integral number of reader code bits are sent during each transponder message code block. For example, where a 16-bit reader code is used, the transponder data rate may allow only four bits (representing four signal variations) to be sent in each transponder message code block. Where the transponder data rate does not permit the reader code to be transmitted in a single message code block, it is desirable to start the reader code sequence coincident with the start of a particular transponder message code block, e.g., the first block of the transponder code sequence. This avoids the possibility, however remote, that a message received from a transponder powered by another reader, and accompanied by the other reader's code, could match the receiving reader's code (e.g., where the two code patterns have the same sequence but start at different points in that sequence).

When transponder message decoder 40 first detects a frame marker in an incoming transponder message, indicating the start of a new transponder message code block, it reports that event to code clock generator 42, which instructs reader code memory 44 to begin encoding the low-frequency signal. Reader code memory 44 is a ROM-type device that contains a binary code individual to reader 10. When prompted by code clock generator 42, reader code memory 44 sends a series of binary signal pulses to coil frequency generator 12, which consists of a voltage-controlled oscillator (VCO) driven by a digital-analog converter. The binary signal pulses from reader code memory 44 directly vary the frequency of the VCO in coil frequency generator 12, which in turn varies the low frequency signal emitted by reader coil 16. The frequency variations in reader coil 16 are also exhibited in transponder coil 18, and therefore appear in the transponder clock signal generated by clock generator 24.

Signal clock extractor 38 is a PLL that is used to determine the clock frequency of the message signal received by RF signal receiver 36. The clock frequency determined by signal clock extractor 38 is used by transponder message decoder 40 to decode the signal received from the transponder. Frequency variations in the transponder clock signal appear as voltage variations on the VCO control signal of the PLL in signal clock extractor 38. Code comparator 48 compares the variations in the transponder clock signal, as reported by signal clock extractor 38, to the variations introduced into the low-frequency signal by reader code memory 44, taking into account the slight time delay involved in transmitting and receiving the coded signals. Such delays can result from energy stored in the high-Q sending and receiving coils. If the two signal variation patterns match, then code comparator 48 confirms that the transponder signals being received by reader 10 are indeed from a transponder being powered by that reader, and no other. If code comparator 48 does not report a match, then the output of transponder message decoder 40 is ignored.

As an alternative to using signal clock extractor 38, a coded clock signal may be generated in the reader (in much the same way as clock generator 24 generates a clock signal in the transponder) and that signal may be used to decode incoming messages. If the coded clock signal generated in the reader does not match the clock signal used by the transponder to encode the message, then transponder message decoder 40 will not be able to decode the incoming message.

Use of the low-frequency power signal to pass a reader code to a transponder and have that code returned in the transponder message clock frequency requires that the system be able to produce a sufficiently large frequency change in a short enough time and yet not upset the ability of the magnetic power link to supply sufficient power to the transponder. To avoid excessive power consumption and to reduce the number of components, both the power transmitting and power receiving coils should be resonated at the operating frequency. However, factors such as temperature and the presence of conductive material within range of the transmitting coil can detune the resonant circuit. The preferred embodiment of the invention, therefore, includes a means for automatically adjusting coil driver 14 to its resonant frequency in between transactions with transponders, when the driving frequency is not being manipulated by the reader code. The adjustment is accomplished by shifting the drive frequency up or down and observing the resulting change in current consumption. When the current is minimized, the coil is at resonance. Since changes in resonant frequency due to temperature tend to affect both the transmitting coil in the reader and the receiving coil in a transponder about the same amount, adjusting the resonance of the coil driver in the reader will tend to compensate for temperature variations at both ends of the magnetic power-transmitting link.

A resonant circuit operates most efficiently exactly at resonance; off-resonance operation typically results in less power delivered by the receiving coil. However, the invention requires that reader coil 16 be driven slightly off-resonance from time to time as frequency variations are introduced by coil frequency generator 12 in response to reader code memory 44.

Figure 2:
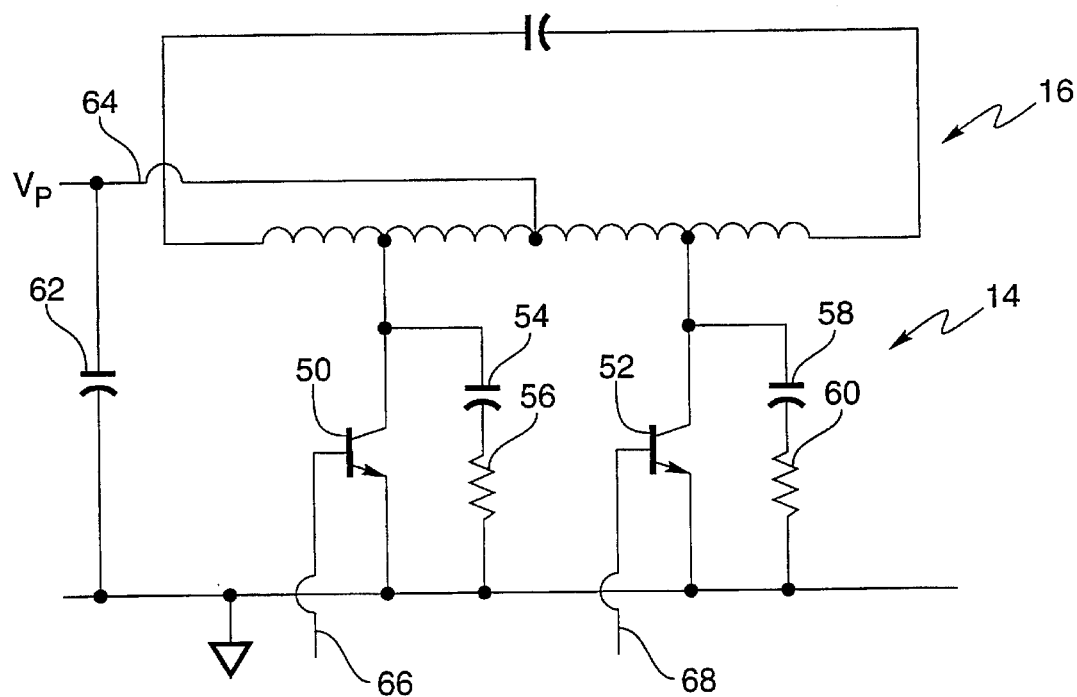
FIG. 2 is a schematic diagram of a coil driver present in the invention.

FIG. 2 shows a detailed schematic of a coil and driver circuit that is particularly well-suited for use in the invention. Line 64 provides a power supply voltage to the midpoint tap of coil 16. Line 64 also is connected through power bypass capacitor 62 to the source terminals of driving transistors 50 and 52. The drains of transistors 50 and 52 are connected to coil 16 at taps spaced symmetrically about the mid-point tap. Lines 66 and 68 provide a gate drive pulse to transistors 50 and 52, respectively. Capacitor 54 and resistor 56 form a "snubber" network that reduces the voltage spike at the drain of transistor 50 when the gate drive pulse on line 66 is terminated. Capacitor 58 and resistor 60 form a similar snubber network for transistor 52. Coil driver 14 drives coil 16 in a "push-pull" fashion, with transistor 50 conducting during a portion of a half-cycle of the driving frequency and transistor 52 conducting during a corresponding portion of the other half-cycle. The pulsed drive applied to the gates of transistors 50 and 52 produces a sinusoidal current in coil 16. If the peak-to-peak sinusoidal voltage at the drains of transistors 50 and 52 is maintained at approximately twice the dc supply voltage, then the ac current flowing in coil 16 will remain essentially constant, even when the coil is operated slightly off-resonance.

As will be understood by those skilled in the art, many changes in the apparatus, methods and applications described above may be made by the skilled practitioner without departing from the spirit and scope of the invention, which should be limited only as set forth in the claims which follow.

In the claims:

1. In combination in a system including a reader and a transponder displaced from the reader for obtaining information associated with the transponder, means at the reader for generating a low-frequency signal;

means at the reader for varying the frequency of the low-frequency signal in a predetermined pattern of frequency variations individual to the reader;

means disposed at the transponder and responsive to the low frequency signal for supplying a transponder clock signal which contains a predetermined pattern of frequency variations which relates to the predetermined pattern of frequency variations individual to a reader;

means disposed at the transponder and responsive to the transponder clock signal for producing an RF signal;

means at the reader for receiving and decoding the RF signal;

means at the reader for extracting the transponder clock signal from the received RF signal and for identifying frequency variations in the transponder clock signal;

means at the reader for comparing the frequency variations in the extracted transponder clock signal with the predetermined pattern of frequency variations in the low-frequency signal to verify whether or not the received RF signal is from a transponder whose clock signal has been supplied by itself.

2. In combination in a system including a reader and a transponder displaced from the reader for obtaining information associated with the transponder, means at the reader for generating a low-frequency signal;

means at the reader for varying the frequency of the low-frequency signal in a predetermined pattern individual to the reader;

means disposed at the transponder and responsive to the low frequency signal for supplying a transponder clock signal;

means disposed at the transponder and responsive to the transponder clock signal for producing an RF signal at a frequency higher than the frequency of the low-frequency signal in a pattern individual to the transponder;

means at the reader for receiving the higher frequency RF signal from the transponder;

means at the reader for generating a message decoding clock signal;

means at the reader and responsive to the message decoding clock signal for decoding the received higher frequency RF signal.

3. The combination set forth in claim 1, further comprising:

means disposed at the transponder and responsive to the low frequency signal for supplying power to the transponder.

4. The combination set forth in claim 2, further comprising:

means disposed at the transponder and responsive to the low frequency signal for supplying power to the transponder.

\* \* \* \* \*